INVENTORS
Kenneth G. Kimble and
Charles W. Ferguson
BY
Nobbe & Swope
ATTORNEYS

Jan. 29, 1963 K. G. KIMBLE ET AL 3,075,327
METHOD AND APPARATUS FOR HANDLING SHEETS OR PLATES
Filed Nov. 17, 1960 2 Sheets-Sheet 2
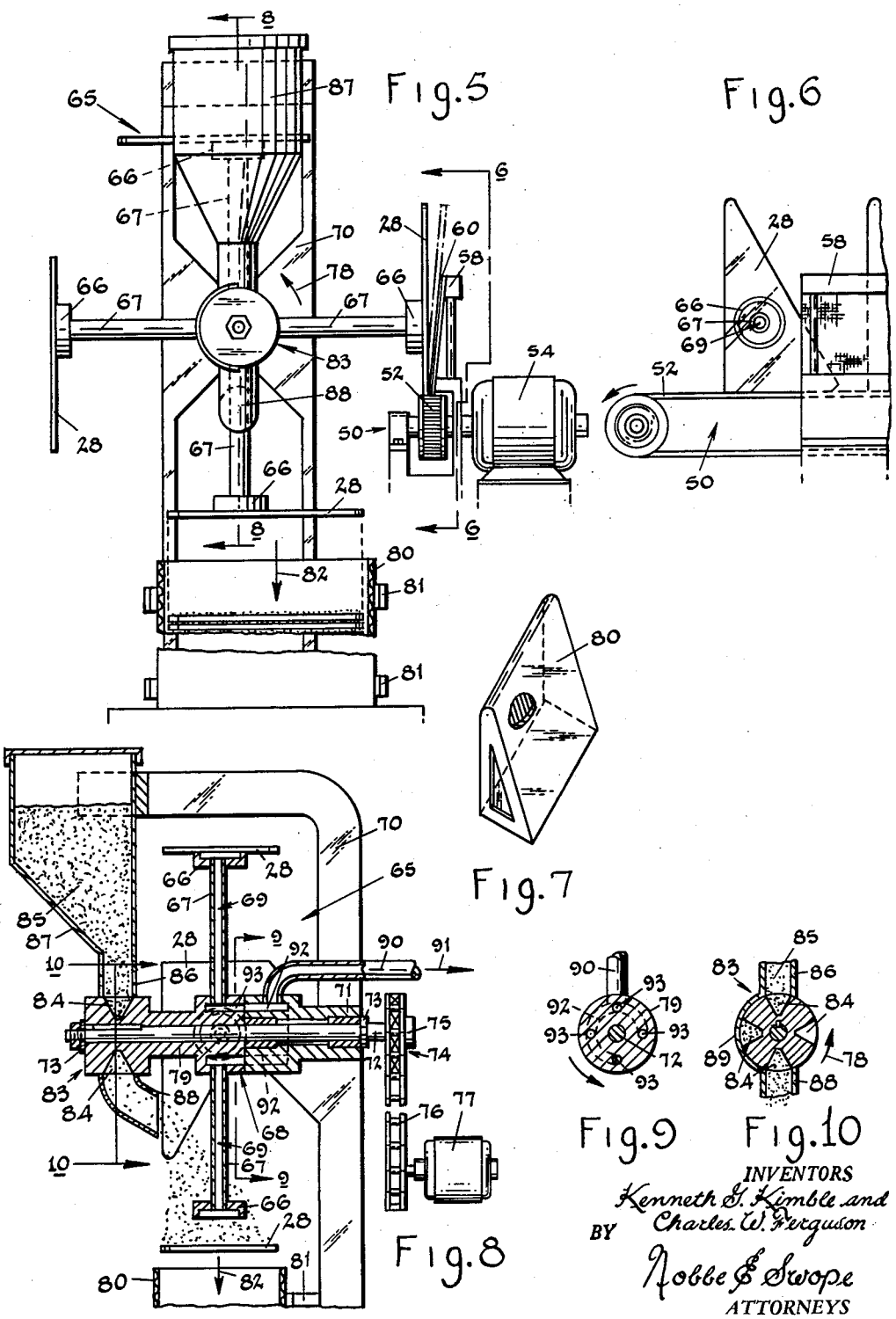
INVENTORS
Kenneth G. Kimble and
Charles W. Ferguson
BY
Robbe & Swope
ATTORNEYS

United States Patent Office 3,075,327
Patented Jan. 29, 1963

3,075,327
METHOD AND APPARATUS FOR HANDLING SHEETS OR PLATES
Kenneth G. Kimble, Temperance, Mich., and Charles W. Ferguson, Perrysburg, Ohio, assignors to Libbey-Owens-Ford Glass Company, Toledo, Ohio, a corporation of Ohio
Filed Nov. 17, 1960, Ser. No. 69,923
11 Claims. (Cl. 53—36)

The present invention relates broadly to the handling of flat sheets or plates and more particularly to an improved method and apparatus for removing glass sheets from a horizontal conveyor and for packaging said sheets in shipping cartons.

Heretofore, the discharging and packaging of glass sheets, for example, as such sheets emerge from a tempering furnace, has been predominantly performed by hand; however, such a hand operation has proved to be extremely costly so that its continued usefulness has been somewhat prohibited by rising costs. This has been brought about largely due to the increased use of tempered glass, and particularly the triangularly shaped ventilator plates, in present-day automobiles.

In addition, it has also been found that the quality standard of the glass sheets or plates and most particularly the surface scratching thereof becomes an important problem when any attempt at automatic handling be attempted. In this respect, the present invention establishes a novel handling system which will provide for fast and efficient packaging while simultaneously insuring that the packaged articles meet the necessary quality standards.

Therefore, according to the present invention, there is provided a method and apparatus for removing glass sheets moving along a conveyor and packaging these sheets into a shipping carton without in any way damaging the surface finish achieved during formation of the glass sheets.

Other objects and advantages of the invention will become more apparent during the course of the following description when taken in connection with the accompanying drawings.

In the drawings wherein like numerals are employed to designate like parts throughout the same:

FIG. 5 is a front elevational view of the packaging apparatus;

FIG. 6 is a sectional view taken along the line 6—6 of FIG. 5;

FIG. 7 is a perspective view of the packaging carton of the present invention;

FIG. 8 is a sectional view taken along the line 8—8 of FIG. 5;

FIG. 9 is a fragmentary sectional view taken along the line 9—9 of FIG. 8; and

FIG. 10 is a fragmentary sectional view taken along the line 10—10 of FIG. 8.

While the instant invention is of particular utility in the handling of sheets of glass emerging from a tempering furnace and will be so described herein by way of example, it will be appreciated that the invention may also be used in handling sheets of glass or other materials emerging from other types of treating or processing apparatus. Also, while the invention will be described herein with particular reference to the handling of triangular sheets, it is also adapted for the handling of other irregularly shaped sheets.

In the above respect, the invention is broadly concerned with a method and apparatus adapted for discharging essentially identically dimensional, non-rectangular flat sheets, preferably having no more than four sides, and in which the center of gravity of each sheet lies closer to a first edge of the sheet than to a second edge thereof, into two groups of sheets of predetermined arrangement, and thereafter packaging such predeterminative arranged sheets of each group.

Figure 1:
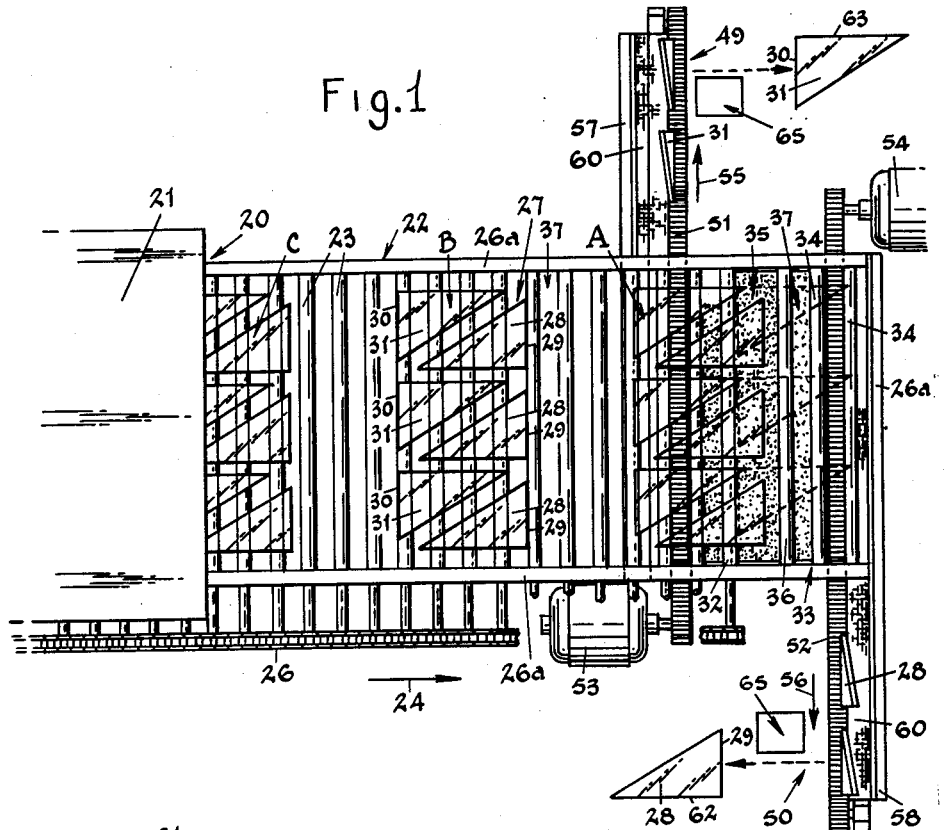
FIG. 1 is a top plan view of the conveyor apparatus of the present invention.
Figures 2, 3, 4:
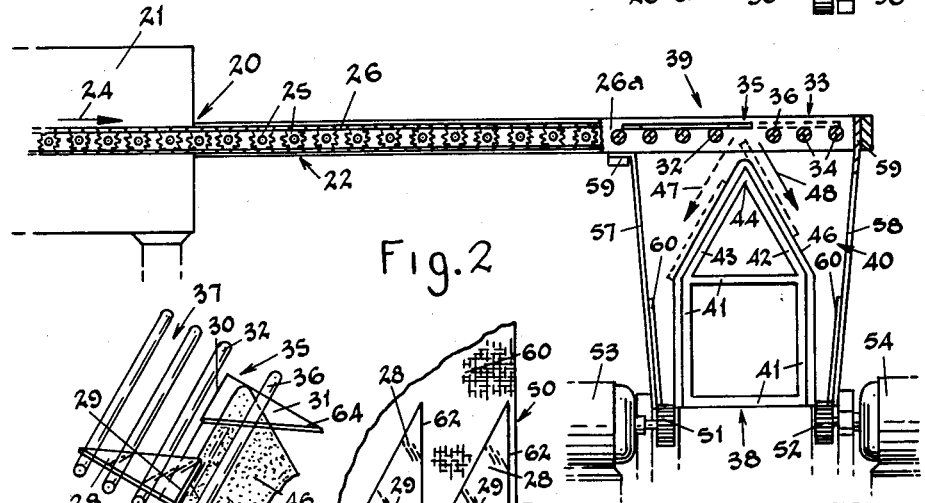
FIG. 2 is a side elevation of the apparatus shown in FIG. 1.
FIG. 3 is an enlarged fragmentary perspective view of a portion of the apparatus shown in FIG. 2.
FIG. 4 is an enlarged fragmentary side elevational view of a portion of the apparatus shown in FIG. 2.

Referring now to the drawings and particularly to FIGS. 1 and 2, there is shown the exit end 20 of a tempering furnace 21. As best seen in FIG. 1, there is provided an endless conveyor 22 including a series of equi-spaced rollers 23 to carry glass sheets emerging from the furnace 21 in the direction of arrow 24. Each of the rollers 23 is provided at one end with a sprocket 25 (FIG. 2) connected to an endless chain 26 so that these rollers 23 are constantly rotated in a clockwise direction whereby the articles or glass sheets resting thereon will be carried along on the conveyor 22 in the direction of arrow 24. The conveyor itself is held in a horizontal plane by its supporting framework 26a.

Now the glass sheets, as best seen in FIG. 1, are carried along in longitudinally spaced groups, for example, groups A, B and C being shown. Since the arrangement of the sheets within each group are the same, it is believed that a detailed description of group B will be sufficient as a description of all of the individual groups.

Each group of sheets is equally spaced from each other group and in each of these groups there are six individual glass sheets 27 which, in the particular embodiment illustrated, are shaped in the form of scalene right triangles arranged in complementary pairs. Thus, in each group of six sheets, three glass sheets 28 are arranged so that the leading edge 29 of each sheet 28, which is the commonly referred to short side of a right triangularly shaped sheet, is arranged transversely to the path of movement of the glass. The edge 29 of each sheet 28 is also aligned parallel to the same edge of each similarly positioned sheet 28 within the same group. The similar short edge 30 of the complementary sheet 31 of each pair is also arranged transversely to the path of movement of the glass and also parallel to the similar edge of like positioned sheets but it is located in the diametrically opposite position or in the trailing edge position, as compared to the leading edge 29 of the previously described sheets 28 of the same group. Thus, within each group of sheets B there are three sheets 28 having a straight edge 29 in the leading edge position and three sheets 31 having the similar edge 30 in the trailing position.

It would be well to mention here that a definite relationship exists between the size of all the glass sheets 27 and the spacing between the rollers 23 of conveyor 22. The glass sheets 28 and 31, being of a triangular shape and moving in the direction of arrow 24, will remain in the same horizontal plane as that of the conveyor device as long as each sheet is supported so that it will not tilt or become inclined so as to fall through the openings between adjacent rollers 23. This is accomplished by making the spacing between each of the rollers 23 less than the lineal distance between the center of gravity or mass of a sheet 28 or 31 in a horizontal position and its respective edge 29 or 30. In this regard, it should be noted that because of the scalene triangular shape, the center of gravity of each sheet 28 and 31 will be located closer to the shorter edge of its configuration, i.e. the edge 29 or 30, than it will be to the vertex formed where the hypotenuse side of the right triangle joins with the long side of the triangle.

Mounted adjacent a roller 32 of conveyor 22 (FIGS.

1 and 2) and spaced therefrom is an extension portion 33 (FIG. 2) of the conveyor. This extension portion 33 is composed of freely rotatable transversely extending equi-spaced rollers 34; however, the clearance space or aperture 35 (FIG. 1) between the roller 32 and the initial transverse roller 36 of the extension portion 33 is greater than the clearance space 37 which exists between the rollers 23 of the conveyor 22. This clearance space 35 is actually greater in length than is the lineal distance between the center of gravity of the sheets 28 and 31 and their before-mentioned vertice as measured parallel to their path of movement 24 along the conveyor 22 (FIG. 3).

Now as the blanks move along the conveyor 22 towards the extension portion thereof 33 in the direction of arrow 24, they will approach the clearance space or aperture 35. This clearance space 35 is positioned directly above a sorting device 38 and, together, clearance space 35 and the sorting device 38 constitute a sorting means or station 39 (FIG. 2).

The sorting device 38 includes a wedge-shaped section or divider 40, which is positioned below the horizontal path of the conveyor 22. The divider 40 includes a supporting framework composed of vertical and horizontal brace members 41 forming a substantially rectangular supporting base, and a pair of inclined brace members 42 and 43 suitably joined to the upper horizontal brace 41. These brace members 42 and 43 are joined together at vertice 44 and this vertice 44 is located directly below the center line 45 (FIG. 3) of clearance space or aperture 35. A covering of a suitable resilient material 46 is placed over the exterior portions of the vertical braces 41 and also the brace members 42 and 43 so that when the glass sheets, which will tumble through clearance space 35 as will later be described, slide across the sorting device 40, they will not be marred by engagement with the surfaces of the sorting device. It should also be pointed out here that this sorting device 38 divides the glass sheets 27 falling through the clearance space 35 into two equal portions. One portion composed of sheets 31 will tumble rearwardly in the direction of arrow 47 across the surface 43, and another portion composed of sheets 28 will tumble forwardly in the direction of arrow 48 along the inclined surface 42.

Turning again to FIG. 1, it is noted that two auxiliary conveyors 49 and 50 are provided, one on each side of conveyor 22. Each conveyor 49 and 50 includes a belt 51 and 52 respectively, which belts are driven by suitable drive means 53 and 54. Each belt 51 and 52 moves in a direction substantially transverse or perpendicular to the direction of motion of the conveyor 22. Thus, conveyor 22 moves in the direction of arrow 55 and the conveyor 50 moves in the direction of arrow 56.

Extending between each of the auxiliary conveyors 49 and 50 and the frame 27 of conveyor 22 are auxiliary brace members 57, 58 that are fastened onto the framework 27 by bolts 59. At least the lower portion of these braces 57, 58 is also covered with a suitable resilient material 60 in order to prevent any accidental marring of the glass sheet surfaces as they tumble down across the wedge 40 to be received upon the conveying belts 51 or 52.

Now as the glass sheets 28 and 31 move along the path of the conveyor 22, they will tumble through the clearance space or aperture 35 and will be divided by the wedge 40 into two equal portions. Therefore, each group of sheets A, B and C, when passing through the sorting station 39, will deposit three of its individual sheets upon the conveyor belt 51 and three of the sheets upon the conveyor belt 52, i.e. all of the sheets 28 will tumble upon the conveyor belt 52 while all of the sheets 31 will tumble upon the conveyor belt 51.

Likewise, as seen in FIG. 4, when this occurs the triangular shaped sheets will rest upon their short edge and will move in a direction along a conveyor so that their long edge will be in a leading position as they move along the auxiliary conveyors 49 and 50. This is best seen by referring to the FIG. 4, wherein there is shown the terminating end 61 of conveyor 50. Each sheet 28 rests upon its short edge 29 and the longer edge 62 will lead as compared to the direction of conveyor movement 56. Since this would be true for both the conveyors 49 and 50, it is believed a description for conveyor 50 will suffice as a description of both conveyors 49 and 50. Thus, referring now to showing FIG. 1 again, each sheet 31 moving along the auxiliary conveyor 49 will rest upon its edge 30 with its edge 63 in the lead position with respect to the path of movement 55.

Referring now to FIG. 3, there will now be described with more particularity, the tumbling action of the glass sheets as they move from the substantially horizontally disposed path of conveyor 22 onto the independent paths of the separate conveyors 49 and 50.

As was previously noted, the sheets 27 in groups A, B and C move across the individual rollers 23 of the conveyor 22 and are supported thereon. The sheets will not fall through between the clearance spaces 37 between the rollers 23 because of the fact that this clearance space 37 is less than the distance between the center of gravity of any sheet and the edge of that sheet which is transversely positioned with respect to the path of the sheets. Thus, it could be said that each sheet of each group is always supported on conveyor 22 in a fashion so that its center of gravity is always positively supported. Now, as each sheet 28 approaches the clearance space or aperture 35 of the sorting station 39, the lead edge 29 (FIG. 3) passes onto and over the clearance space. Before this edge 29 is positively supported by the roller 36 (i.e. the lead roller of the extension portion 33), the center of gravity of the sheet 28 will pass over the roller 32 of the conveyor 22. When this happens, the glass sheet 28, by reason of the position of its center of gravity, will be caused to fall downwardly in the direction of arrow 48 onto the inclined surface 42 of the triangular shaped sorting device 38. This follows because the roller 36 is spaced from the roller 32, as aforementioned, a distance greater than the distance from the edge 29 of the sheet to the center of gravity of the sheet 28. This glass sheet 28 will then tumble downwardly across the surface of the brace member 42 of wedge section 40 and fall upon the belt 52 of the conveyor 50 resting on the edge 29. When this happens, the sheet 28 will fall against the brace member 58 and under the tractive force of the belt 52, will be carried along the conveyor path of the conveyor 50 in the direction of arrow 56 (FIG. 1). Thus, each sheet 28 in successive groups A, B and C will similarly fall in the fashion aforedescribed and thus from each group, one portion of sheets composed of three sheets will be deposited upon the conveyor 50 and carried thereacross for further processing. Also, as is seen in FIG. 1, the edge 62 which corresponds to the long side of the right triangle configuration, will be in the advanced position as the sheet 28 moves along conveyor 50 in the direction of arrow 56.

Turning now to the complementary sheet 31, as this sheet moves along the direction of arrow 24, its vertex will pass across the roller 32 of the conveyor 22 and will also pass across the clearance space 35 and be received upon the initial roller 36 of the extension portion 33 of conveyor 22 before the center of gravity of the sheet 31 passes across the roller 32. This follows since, while as was pointed out above, the space 35 is always greater in length than is the distance between the center of gravity of a sheet and its shorter edge, the clearance space 35 is also less in length than is the distance between the vertex 64 of this sheet 31 and its center of gravity. Thus, as the sheet 31 moves across space 35, the center of gravity will not have passed beyond the roller 32 until after the vertex 64 passes beyond the roller 36. Therefore, the sheet 31 will not be tipped downwardly at this time.

However, as the sheet 31 continues to travel onto extension portion 33, the center of gravity of the sheet 31 will pass over the clearance space 35. When the trailing edge 30 of sheet 31 has its support removed, that is, when it is passed beyond the roller 32, the center of gravity will not yet have passed across and over the supporting line established by the roller 36. In this case then, the edge 30 will be unsupported and the center of gravity will not have reached the roller 36 so that the sheet 31 will tip backwardly and fall downwardly in the direction of arrow 47 onto the inclined surface 43 of the wedge 40. The sheet will slide across the surface 43 and will fall onto the belt 51 of the conveyor 49. As was aforedescribed, and as seen in FIG. 1, the sheets 31 will then be carried across the conveyor 49 in the direction of arrow 55 resting upon the edge 30 and with its long side edge 63 in the advanced position. All of the sheets 31 in successive groups A, B and C will accordingly be similarly tumbled and fall upon the conveyor 49.

Thus, it is seen that as each group of sheets A, B and C passes across the clearance space 35, three sheets will be caused to tumble through this clearance space 35 and will be deposited upon one auxiliary conveyor 50 for movement in the direction of arrow 56, while the three complementary sheets of the same group will fall through the clearance space 35 and be deposited upon the conveyor 49 for movement in the direction of arrow 55. In both cases the sheets will ride across the conveyor in a substantially vertical position, but slightly tilted because of inclined braces 57 and 58 (FIG. 2).

Thus, there has been described the method and apparatus for sub-dividing each group of sheets into two independent portions wherein all of the sheets passing along a first conveyor are separated into two independent equal streams of glass sheets moving along independent conveyors away from the first or primary stream exiting from a tempering furnace 21.

Having above described the action wherein the glass sheets are separated into two independent streams and portions moving along the path of a conveyor 49 or 50, it is now desired to examine the packaging of these individual sheets into their shipping cartons. This includes removing each stream of sheets from the path of one of the conveyors 49 or 50 and the placement of them individually and separately into shipping cartons. Since identical packaging devices 65 are provided, one for a conveyor 49 and one for a conveyor 50, it is believed that a showing and discussion of the packaging device provided for one of the auxiliary conveyors will suffice as a description for both. It is understood that there is a packaging device 65 (FIG. 1) provided for each of the conveyors 49 and 50 and that it is fully intended by the scope of the present invention to cover the use of a packaging device with each of the auxiliary conveyors.

Turning now to FIG. 5, there is shown in detail the packaging device 65 associated with the conveyor 50. This packaging device 65 includes four suction cups 66 mounted to radially extending arms or bars 67 which extend from a central hub assembly 68. Each of these arms or bars has a hollow interior 69 (FIG. 8) for a purpose to be later described. Each arm 67 is at a 90 degree angle with respect to both adjacent arms 67.

Referring to FIGS. 5 and 8 most particularly, a supporting framework 70 is provided to receive or to hold the hub assembly 68 which includes a fixed bushing 71. A rotating shaft 72 passes through this fixed bushing 71 and is held laterally immobile and fixed with respect to the framework 70 by collars 73, one collar 73 abutting other elements of the hub assembly 68. Mounted to the driving end 74 of shaft 73 is a sprocket gear 75 meshed to a link chain 76 driven by a motor 77 so that shaft 72 is intermittently rotated in the direction of arrow 78 (FIG. 5), i.e. in a counter clockwise direction.

Each of the arms 67 is received into and fixedly joined to a bushing 79 suitably keyed or held rigid by any suitable means to the shaft 72 to rotate therewith. Thus, as the shaft 72 rotates, the sleeve or bushing 79 will rotate therewith causing the arms 72 to swing about the central axis of the shaft 76. The motion of arms 67 is an intermittent four-cycle motion induced by timing of motor 77 so that there is momentary pause each time that arms 67 assume the positions shown in FIG. 5. In this position (i.e. the rest position), two of the arms 67 are substantially vertical and two of the arms 67 are substantially horizontal. In this rest position, the lowermost arm 67 (i.e. the one projecting downwardly from the shaft 72) is positioned directly over a shipping carton 80. This shipping carton 80 is held in position resting upon any suitable support by means of braces or brackets 81 which are suitably connected to the framework 70. These brackets 81 thus serve to register the carton 80 with respect to the downwardly positioned arm 67 so that a glass sheet 28 carried by a suction cup 66 from conveyor 50 to a position above carton 80 will fall downwardly in the direction of arrow 82 and be properly located within the carton upon the release of the suction pressure by means later to be described.

Turning now to FIGS. 8 and 10, there is shown vane 83 forming a part of the bushing 79. This vane 83 has a series of equal volume pockets 84 which receive granular material 85 falling by gravitation through the hopper 86 which itself is rigidly positioned by the framework 70. The granular material 85 falls through the restricted passageway 86 at the lower end of the hopper 87 and into the pockets 84 thereopposite. As the vane 83 rotates with the shaft 72, in the direction of arrow 78, each pocket 84 will carry granular material 85 from the discharge 86 of hopper 87 to an ejection chute 88 from which it falls into the carton 80. Accidental discharge is prevented by the shield member 89 (FIG. 10) extending from discharge 86 to ejection chute 88. It is also noted that four pockets 84 are in phase relationship to each of the four arms 67.

Since the movement of vane 83 is synchronized to the movement of the glass carrying arms 67, as each sheet 28 falls into the carton 80 a shower of the granular material 85 is directed into the carton 80 simultaneously therewith or slightly in advance of the blank 28. This forms a compression or cushioning bed between each of the glass sheets. Thus, when each succeeding sheet 28 is dropped into the carton 80, it does not fall directly into glass contacting relationship which might possibly shatter the glass so deposited. By so placing a small dispersement of this fine granular material 85 over each of the glass sheets during insertion into the carton 80, the possible chance of shattering is eliminated because of the cushioning action of the granular materials 85 upon the upper surface of the glass sheet already deposited in the carton 80.

Turning now to FIGS. 6 and 7, as the glass sheet 28 moves along the path of belt 52 of conveyor 50, it rests on the guide plate or brace 58 (FIGS. 2 and 6). In this position, the sheet 28 is slightly tilted by its own weight and is so prevented from falling off the belt 52. As the belt 52 carries the sheet towards the packing apparatus 65, due to the fact that the brace 58 terminates short of the final termination point of the conveyor, the glass sheet 28 comes directly opposite to a suction cup 66 as seen in FIG. 6. At this time the sheet 28 is in a position as shown in dotted outline in FIG. 5. At this moment the arm 67 opposite to and horizontal with the conveyor 50 will have suction applied to its cup 66, in a fashion to be later described. This suction is applied in sufficient force to cause the sheet to move from its resting position against brace 58 on the conveyor 52, i.e. its dotted outline position, into firm and tight engagement with the suction cup 66 on the arm 67 as shown in the full line position of FIG. 5.

Turning now to FIGS. 8 and 9, a vacuum is applied to cup 66 through the hollow interior 69 of arm 67 from any suitable source connected thereto through a conduit 90, the vacuum exerting a force in the direction of arrow 91 constantly.

The bushing 71 of hub assembly 68 has a passageway or chamber 92 connected to this suction conduit 90. The bushing 79 (FIG. 10) includes four bores or passages 93. One bore 93 communicates with each cup 66 through the hollow interior 69 of the arm 67 to apply vacuum to operate the suction cups 66. This suction force originating through conduit 90 evacuates the open chamber 92 of fixed bushing 71 and also the bores 93 of rotating bushing 79 that are in communication therewith.

As is seen in FIG. 9, where chamber 92 is seen in dotted outline, the chamber 92 is not open in the fourth quadrant of the bushing 71. Any bore 93 passing through this blocked fourth quadrant section would not, therefore, receive any vacuum force from chamber 92 whereby no suction would be supplied to any cup 66 whose vacuum communicating bore 93 was incommunication with the blocked fourth quadrant of the bushing 71.

Therefore, as the shaft 72 rotates to bring the arm 67 into the downward extending position of FIG. 8, the granular material 85 would first be placed in the carton by rotation of vane 83, and then as the arm 67, in the next phase of its intermittent rotation, assumes a true vertical position, the vacuum communicating bore 93 of that arm would begin to pass from communication with chamber 92 of fixed bushing 71 and into the blocked fourth quadrant of the bushing 71. At this moment, the vacuum holding the sheet 28 to the suction cup 66 would be interrupted and the sheet would fall into carton 80 onto the granular bed.

Thus, by so timing the relationship of the bushing 71 with respect to the bushing 79, it is possible to insure the granular material will be deposited into the carton before the glass sheet is released or at least simultaneously therewith.

When that same arm 67, having ejected its glass sheet 28 into carton 80, assumes again a horizontal position opposite to a conveyor 50, its suction communicating channel 93 will have passed into the first quadrant of bushing 71 and again be in free communication with the suction passage 92 of the bushing 71. At this time, suction will be applied to this cup 66 and that cup 66 will pull a glass sheet from an inclined position against brace 58 into firm engagement with cup 66. This sheet will then be ready to be carried by the suction cup around hub 68 in a circular path so that another glass sheet will be deposited in the carton 80.

Generally speaking, the spacing between successive groups A, B and C of the glass sheets on conveyor 22, as shown in FIG. 1, is so timed that there will be delivered to each of the conveyors 49 and 50 an endless but consistently spaced equal quantity of glass sheets 28 and 31. The rotary movement of shaft 72 is timed to this spacing so that shaft 72 will intermittently be rotated in timed arrangement to the passage of the glass sheets deposited on the conveyors 49 and 50, from conveyor 22.

As seen in FIG. 7, the carton 80 in which the glass sheets are packed is itself triangular in shape so as to form a tightly enclosed package for the glass sheets. Since the granular material 85 has been introduced into the carton, and this material effectively prevents scratching of the glass blanks by eliminating raw surface-to-surface contact, the sheets are ready for shipment and the operator of the device need only to replace the carton 80 when it is filled.

Therefore, in summary, the present invention relates to a method and apparatus for handling glass sheets or plates wherein a plurality of glass sheets arranged in contingents or groups on a first conveyor will be initially separated into two individual portions at a dividing station located along the path of the first conveyor. Each of the portions will be caused to move along independent paths and these glass sheets, passing along the independent paths formed by two auxiliary or second conveyors, will be later picked up by a rotating packaging apparatus composed of four equi-spaced radial arms having suction cups thereon. The glass sheets will be carried by this suction type packing apparatus from the path of each second conveyor about an arch of substantially 270 degrees to a position where it can be released to fall along a vertical drop and be deposited into a carton. The continuous intermittent cycling of this device provides a continuous method and apparatus for packaging triangular ventilator plates exiting from a tempering furnace and for placing these plates directly into a shipping carton. At the same time that the glass sheets are carried by the conveyor into a position where they may be dropped into a shipping carton, granular material is dispensed into the carton to form a protective shield calculated to protect the sheet during the packaging operation and also to provide protection for the glass sheet against accidental chipping, scratching or marring during the course of their shipment in their respective cartons.

As previously mentioned, and as will be appreciated by those skilled in the art, the apparatus in accordance with the invention is capable of discharging and sorting other various shaped sheets besides those of triangular form. In this respect, it is only necessary that the sheets to be discharged and sorted be essentially identically dimensioned and non-rectangular, preferably having no more than four sides, and wherein the center of gravity of each of the sheets lies closer to a first edge of the sheet than to a second edge thereof.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. A method of continuously discharging and sorting essentially identically dimensioned non-rectangular flat sheets having no more than four sides from a substantially horizontally disposed conveyor determining a path along which said sheets move into two portions of predetermined arrangement, and thereafter packaging such predeterminatively arranged sheets, the center of gravity of each of said sheets lying closer to a first edge of the sheet than to a second edge thereof, including similarly positioning a first contingent of the sheets on said conveyor so that their said first edges are disposed forwardly of the center of gravity of the sheets with respect to the direction of movement thereof and substantially transverse to said direction, similarly positioning a second contingent of the sheets on said conveyor so that their said first edges are disposed rearwardly of the center of gravity of the sheets with respect to said direction and also substantially transverse to said direction, passing said contingents of sheets along said path to a predetermined area while positively supporting the center of gravity of each sheet on said conveyor so that the sheets are maintained in a horizontal plane, thereafter passing said sheets over a longitudinally extending aperture in said conveyor, said aperture being of a length greater than the lineal distance between the center of gravity of the sheets and said first edges thereof but smaller than the lineal distance between the center of gravity and the rearward-most point on the surface of the sheets as measured along the line of direction of movement thereof, whereby said first contingent of sheets will fall forwardly into said aperture, and said second contingent of sheets will fall rearwardly into said aperture, separately arresting the fall of each of said contingents with the sheets of each contingent resting on their said first edges, moving each of said separate contingents along individual paths of movement, and removing said sheets from their individual paths of movement and depositing said removed sheets sequentially into containers.

2. A method as claimed in claim 1, in which said removed sheets are deposited sequentially into containers so that they lie horizontally on a major surface thereof in super-imposed relationship.

3. A method as claimed in claim 1, including rotating said removed sheets so that their major surfaces lie in a substantially horizontal plane, and simultaneously providing a layer of granular material between each sheet as they are deposited sequentially into said containers.

4. A method of continuously discharging and sorting essentially identically dimensioned non-rectangular flat sheets having no more than four sides from a substantially horizontally disposed conveyor determining a path along which said sheets move into two portions of predetermined arrangement, the center of gravity of each of said sheets lying closer to a first edge of the sheet than to a second edge thereof, including similarly positioning a first contingent of the sheets on said conveyor so that their said first edges are disposed forwardly of the center of gravity of the sheets with respect to the direction of movement thereof and substantially transverse to said direction, similarly positioning a second contingent of the sheets on said conveyor so that their said first edges are disposed rearwardly of the center of gravity of the sheets with respect to said direction and also substantially transverse to said direction, passing said contingents of sheets along said path to a predetermined area while positively supporting the center of gravity of each sheet on said conveyor so that the sheets are maintained in a horizontal plane, thereafter passing said sheets over a longitudinally extending aperture in said conveyor, said aperture being of a length greater than the lineal distance between the center of gravity of the sheets and said first edges thereof but smaller than the lineal distance between the center of gravity and the rearward-most point on the surface of the sheets as measured along the line of direction of movement thereof, whereby said first contingent of sheets will fall forwardly into said aperture and said second contingent of sheets will fall rearwardly into said aperture.

5. A method of continuously discharging essentially identically dimensioned flat sheets from a substantially horizontally disposed conveyor determining a path along which said sheets move into two portions of predetermined arrangement, said sheets being of scalene, right triangular shape whereby the center of gravity of each sheet lies closer to the smallest side of the sheet than to the vertex formed by the hypotenuse and longer side thereof, including positioning a first contingent of the sheets on said conveyor so that the smaller sides thereof are disposed forwardly of the center of gravity of the sheets with respect to the direction of movement thereof and additionally are disposed substantially transverse to said movement direction, positioning a second contingent of the sheets on said conveyor so that the smaller sides thereof are disposed rearwardly of the center of gravity of the sheets with respect to the said direction of movement with such smaller sides also being disposed substantially transverse to said direction, passing said contingents of sheets along said path to a predetermined area while positively supporting the center of gravity of each sheet on said conveyor so that the sheets are maintained in a horizontal plane, and thereafter passing said sheets over a longitudinally extending aperture in said conveyor, said aperture being of a length greater than the lineal distance between the center of gravity of the sheets and said smaller sides thereof but smaller than the lineal distance between the said vertex and the center of gravity of the sheets, whereby said first contingent of sheets will fall forwardly into said aperture and said second contingent of sheets will fall rearwardly into said aperture.

6. In a glass handling apparatus for sorting, arranging and packaging glass sheets in stacked relation in shipping cartons, the combination of a first substantially horizontally disposed conveyor for moving a plurality of independent glass sheets in an endless stream along a predetermined path, sorting means to receive sheets from said first conveyor and to separate the sheets moving therealong into two separate portions, said sorting means including a longitudinally extending aperture in said first conveyor and a wedge-shaped divider comprising two inclined substantially flat surfaces which intersect to form a vertex, means mounting said divider below the path of said first conveyor with said vertex being positioned adjacent and centrally of said aperture and extending transversely thereof, a pair of second conveyors independent of said first conveyor, each of said second conveyors receiving one portion of sheets from said sorting means and moving said sheets along independent paths, and packaging means associated with each of said second conveyors to remove the sheets individually from each of said second conveyors and to deposit the individual sheets into shipping cartons.

7. An apparatus in accordance with claim 6, in which one of said second conveyors is positioned on one side of said divider and the other of said second conveyors is positioned on the other side of said divider, with both of said second conveyors extending outwardly from said first conveyor in different directions.

8. An apparatus in accordance with claim 7, in which said packaging means includes means for individually removing sheets from the path of each of said second conveyors and carrying the sheets into a position directly above a shipping carton, means to automatically release said sheets for free fall into the carton upon reaching said position, and means operatively associated with said removing means for dispensing portions of granular material onto each of said sheets so that a protective layer of said granular material is deposited between adjacent sheets disposed in said carton.

9. An apparatus in accordance with claim 8, wherein said means for removing the sheets includes a hub, four radially spaced hollow arms extending from said hub, a suction cup on each arm, means for intermittently rotating said hub, means for applying a vacuum to said suction cups, and selectively operable means to interrupt the application of said vacuum.

10. An apparatus for continuously discharging and sorting essentially identically dimensioned non-rectangular flat sheets having no more than four sides from a substantially horizontally disposed path along which said sheets move into two portions of predetermined arrangement, the center of gravity of each of said sheets lying closer to a first edge of the sheet than to a second edge thereof, said apparatus comprising a conveyor determining said path along which said sheets move, said sheets being positioned upon said conveyor in two contingents, the sheets of one contingent being arranged so that their said first edges are disposed forwardly of the center of gravity of the sheets with respect to the direction of movement thereof and the sheets of the second contingent being arranged so that their said first edges are disposed rearwardly of the center of gravity of the sheets with respect to the direction of movement thereof, the said first edges of the sheets of both contingents being disposed transverse to the direction of movement thereof, means for driving said conveyor to effect movement of said contingents of sheets to a predetermined area while positively supporting the center of gravity of each sheet on said conveyor so that the sheets are maintained in a horizontal plane, and a conveyor extension longitudinally spaced from said conveyor at said predetermined area, said conveyor extension being spaced from said conveyor a length greater than the lineal distance between the center of gravity of the sheets and said first edges thereof but smaller than the lineal distance between the center of gravity and the rearward-most point on the surface of the sheets as measured along the line of direction of movement thereof.

11. In an apparatus as claimed in claim 10, wherein said conveyor and said conveyor extension comprise a plurality of rotatable transversely extending rollers, means for driving those rollers defining said conveyor to move said sheets forwardly along said conveyor, the spacing between each adjacent roller of both said conveyor and said conveyor extension being less than the distance between the center of gravity of each sheet and the said transversely positioned edge thereof.

References Cited in the file of this patent

UNITED STATES PATENTS 2,971,309     Miskel et al.  ---------- Feb. 14, 1961